O. L. MULLENDORE & O. H. STEVENSON.
PLATE HOLDER ATTACHMENT FOR CAMERA BACKS.
APPLICATION FILED JUNE 30, 1917.
1,249,172.
Patented Dec. 4, 1917.
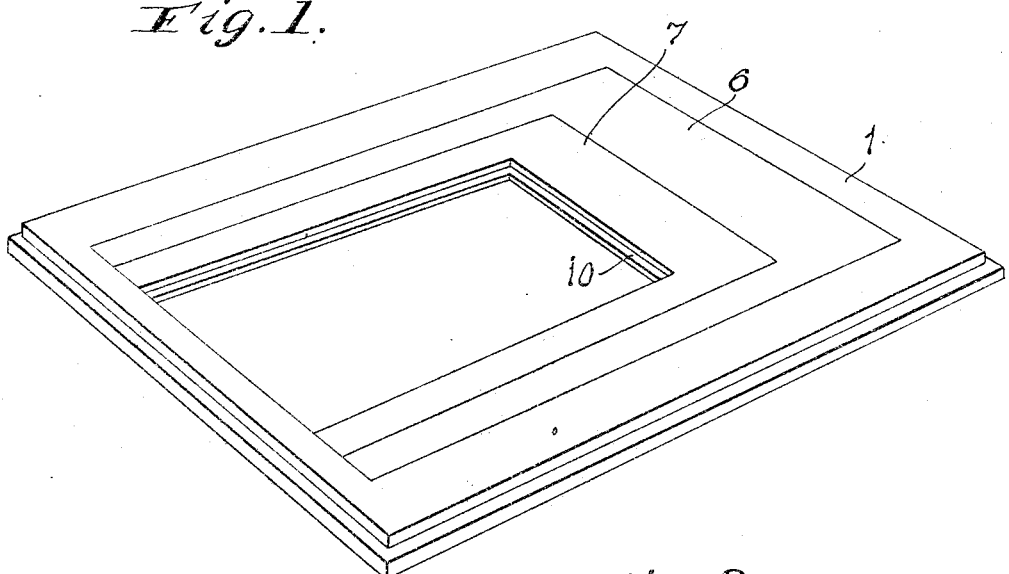
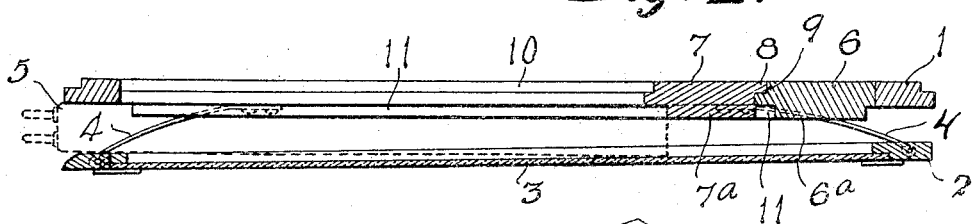
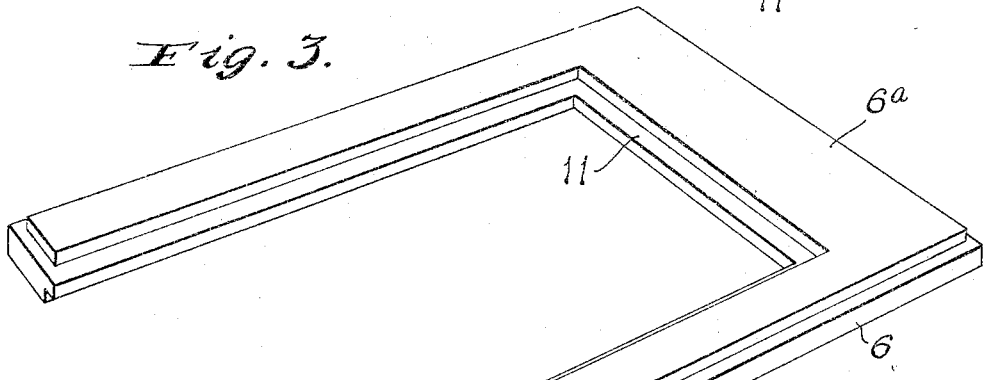
Inventors
O. L. MULLENDORE AND
O. H. STEVENSON
By
H. S. Kier
Attorney

UNITED STATES PATENT OFFICE.

OTIS L. MULLENDORE AND OLIN H. STEVENSON, OF ROANOKE, ALABAMA.

PLATE-HOLDER ATTACHMENT FOR CAMERA-BACKS.

1,249,172. Specification of Letters Patent. Patented Dec. 4, 1917.

Application filed June 30, 1917. Serial No. 177,941.

*To all whom it may concern:*

Be it known that we, OTIS L. MULLENDORE and OLIN H. STEVENSON, both citizens of the United States, residing at Roanoke, in the county of Randolph, State of Alabama, have invented a new and useful Plate-Holder Attachment for Camera-Backs; and we do hereby declare the following to be a full, clear, and exact description of the invention, such as will enable others skilled in the art to which it appertains to make and use the same.

The present invention relates to a plate holder adapter attachment for camera backs, and has for its object to provide a device of this character which embodies novel features of construction whereby it can be readily applied to the conventional camera backs furnished in connection with all of the standard makes of cameras, without the necessity of removing the original back and substituting a specially constructed back. We are aware of the special camera backs provided with kits of nested rectangular frames held in position by latches and adapted to be substituted for the regular camera back, the kit of nested rectangular frames enabling different sizes of plate holders to be used, but these specially constructed camera backs necessitate the purchase of an entirely new back to be substituted for the original back, and are not adapted for field and outside work, for the reason that they are heavy and cumbersome to carry around.

Further objects of the invention are to provide a plate holder adapter of this character which is comparatively simple and inexpensive in its construction, which can be readily applied to any conventional camera back, which does not require latches or special fastening means to hold it in position, which can be easily carried from place to place, and which will enable smaller sizes of plate holders to be used with the best of results.

Another important advantage incident to the use of the invention is that it eliminates the necessity of having access to a dark room until as many exposures are made, of various sizes, as may be provided for in the number of different sized plate holders at hand. This advantage is especially important in out-door and outside work, where a dark room is very seldom available.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a camera back having a plate holder adapter constructed in accordance with the invention fitted therein, the inner face of the back being shown.

Fig. 2 is a longitudinal sectional view through a camera back and ground glass frame, showing the adapter as inserted in position within the camera back, and a small size plate holder clamped in operative position by the ground glass frame.

Fig. 3 is a detail perspective view of the larger section of the plate holder adapter.

Corresponding and like parts are referred to in the following description and indicated in all the views of the drawings by the same reference characters.

Specifically describing the present embodiment of the invention, the numeral 1 designates a conventional camera back such as that with which all of the standard makes of cameras are provided, and 2 a ground glass frame which carries the ground glass 3 employed in obtaining a proper focus before making an exposure. This ground glass frame 2 is connected to the camera back 1 by means of the usual springs 4, and serves as a clamping member for holding a plate holder, such as that indicated by 5 in operative position. The camera back, ground glass frame, and plate holder are all of the well-known and conventional construction, and no claim to novelty is based thereon.

The plate holder adapter attachment is illustrated as including an outer frame 6 and an inner frame 7 which is nested within the frame 6, the frame 6 being employed without the frame 7 when the first smaller size of plate holder is to be used, while the frame 7 is used in connection with the frame 6 when the second smaller size of plate holder is to be used. These frames 6 and 7 are both three-sided open ended frames, the open ends thereof facing in the same direction so that the smaller sizes of plate holders are clamped in position toward one end of the camera back, thereby enabling the plate holders to be easily placed in position and removed therefrom, as well as enabling the slides of the plate holders to be manipulated without difficulty.

The larger adapter frame 6 is formed with edges which fit snugly within and tightly engage the inner edges of the camera back 1, and the sides of the adapter frame may have a resilient formation so as to spring outwardly into a tight frictional engagement with the camera back, thereby enabling the frame to be held securely in position without the use of latches or other fastening members, and also insuring a tight joint between the adapter frame and the camera back. This resilient action of the sides of the adapter frame is made possible by the fact that the frame has an open ended formation, thereby enabling the free ends of the sides of the frame to be given a resilient construction so that they will tend to spring apart when compressed and produce a tight frictional engagement with the camera back when placed in position. The inner frame 7 is provided at the two sides and end thereof with a laterally projecting flange 8 which is adapted to fit within a corresponding rabbeted seat 9 formed in the inner edge of the larger frame 6 at the back thereof. A similar rabbeted seat 10 may be formed in the inner edge of the inner frame 7 for engagement with the flange of a third and still smaller adapter frame which may be nested within the inner frame 7 if it is desired to make provision for using a third smaller size of plate holder.

The inner faces of the adapter frames 6 and 7 are preferably flush with the inner face of the back 1 when the adapter frames are in position, as indicated upon the drawing, while the outer faces of the adapter frames are formed with raised portions 6ª and 7ª respectively which are adapted to project into the ground glass frame 2 when the latter is sprung inwardly against the camera back in position for focusing. The outer face of each of the adapter frames is also provided at the sides and end thereof with a rabbeted seat 11 providing a slideway and a seat for the particular size of plate holder adapted to be used in connection with the frame. In Fig. 2 the plate holder 5 is shown as slipped within the rabbeted seat 11 of the second adapter frame 7, being clamped firmly in position within this seat by the ground glass frame 2, the outer end of the plate holder being disposed at the end of the camera back so that the slides thereof can be easily manipulated in the usual manner, and the plate holder itself removed from and placed in position without difficulty. One or more of the adapter frames may be used, as desired, the number of the said frames furnished in a kit depending upon the number of sizes of plate holders which it is desired to make provision for using. All of the adapter frames are formed with three sides and an open end, the open ends all facing in the same direction when the adapter frames are assembled, and the sides of the various frames preferably having a spring action so that they will expand into a tight frictional engagement with the next larger frames or the camera back, thereby enabling the device to be held securely in position without the use of latches or fastening members, and insuring lightproof joints.

Having thus described the invention, what we claim as new and desire to secure by Letters Patent, is:—

1. A plate holder adapter for camera backs, including, in combination with a ground glass frame and plate holder, a three sided open ended frame fitting accurately within the camera back, said frame being rabbeted at the inner edges thereof to provide a seat which faces the ground glass frame and coöperates therewith to hold the plate holder in position, the plate holder being insertible into and removable from position from the side of the camera back toward which the open end of the adapter frame faces.

2. A plate holder adapter for camera backs, including, in combination with a ground glass frame and plate holder, a three sided open ended frame fitting accurately within the camera back and having resilient sides which expand into a tight frictional engagement with the camera back, said frame being rabbeted at the inner edges thereof to provide a seat which faces the ground glass frame and coöperates therewith to receive the plate holder.

3. A plate holder adapter for camera backs, including, in combination with a ground glass frame and plate holder, a three sided open ended frame fitting accurately within the camera back and provided upon the rear face thereof with a raised portion projecting from the camera back and fitting into the ground glass frame, the inner edges of the adapter frame being rabbeted to provide a seat which faces the ground glass frame and coöperates therewith to hold a plate holder in position, the plate holder being insertible into and removable from position from the end of the camera back toward which the open end of the adapter frame faces.

4. A plate holder adapter for camera backs, including, in combination with a ground glass frame and plate holder, a nested set of open ended frames assembled with the open ends thereof all facing in the same direction, the larger frame fitting accurately within the camera back and all of the frames being provided at their inner edges with rabbeted plate holder receiving seats, the inner frames being adapted to be successively removed to adapt the device for use with successively larger plate holders.

5. A plate holder adapter for camera backs, including, in combination with a ground glass frame and plate holder, a nested set of open ended frames assembled with the open ends thereof all facing in the same direction, the largest frame being adapted to fit accurately within the camera back and each of the frames being provided with a rabbeted groove at the back thereof and a rabbeted plate holder receiving seat at the front thereof, the smaller frames having flanges which engage the rabbeted grooves, the smaller frames being successively removable to adapt the device for use in connection with successively larger plate holders.

6. A plate holder adapter for camera backs, including, in combination with a ground glass frame and plate holder, a nested set of open ended frames assembled with the open ends all facing in the same direction and having resilient sides adapted to expand into a tight frictional engagement with each other and the camera back, the inner side of each frame being formed with a rabbeted groove while the outer side thereof is formed with a raised portion adapted to project into the ground glass frame and also with a rabbeted plate holder receiving seat, the inner frames being successively removable to adapt the device for use in connection with successively larger plate holders.

In testimony whereof we have signed our names to this specification in the presence of two subscribing witnesses.

OTIS L. MULLENDORE.
OLIN H. STEVENSON.

Witnesses:
G. B. WALKER,
R. E. TYLER.

Copies of this patent may be obtained for five cents each, by addressing the "Commissioner of Patents, Washington, D. C."